United States Patent
Little

(10) Patent No.: US 12,263,969 B1
(45) Date of Patent: Apr. 1, 2025

(54) WALL ROLLING UAV WITH RING CAGE

(71) Applicant: The United States of America as represented by the Secretary of the Navy, Newport, RI (US)

(72) Inventor: Matthew C Little, Fall River, MA (US)

(73) Assignee: The United States of America as Represented by the Secretary of the Navy

( * ) Notice: Subject to any disclaimer, the term of this patent is extended or adjusted under 35 U.S.C. 154(b) by 0 days.

(21) Appl. No.: 18/244,614

(22) Filed: Sep. 11, 2023

(51) Int. Cl.
| B64U 60/60 | (2023.01) |
| B64U 10/16 | (2023.01) |
| B64U 101/00 | (2023.01) |

(52) U.S. Cl.
CPC ............ *B64U 60/60* (2023.01); *B64U 10/16* (2023.01); *B64U 2101/00* (2023.01)

(58) Field of Classification Search
CPC ...... B64U 60/60; B64U 10/16; B64U 30/299; B64C 25/001; B64C 25/32
See application file for complete search history.

(56) References Cited

U.S. PATENT DOCUMENTS

| 2014/0131507 A1* | 5/2014 | Kalantari | B60F 5/02 244/2 |
| 2016/0176514 A1* | 6/2016 | Lavagen | B64C 25/54 244/50 |
| 2017/0050726 A1* | 2/2017 | Yamada | B64U 60/60 |
| 2017/0297681 A1* | 10/2017 | Yamada | B64U 10/13 |
| 2018/0074517 A1* | 3/2018 | Yamada | B64U 60/60 |
| 2018/0251212 A1* | 9/2018 | Sugaki | B64U 50/14 |
| 2021/0114730 A1* | 4/2021 | MacDonald | F16C 19/10 |

OTHER PUBLICATIONS

Strimel, Greg et al. "Engaging Children in Engineering Design Through the World of Quadcopters." Children's Technology and Engineering, May 2017, available at www.researchgate.net/publication/316609149_Engaging_Children_in_Engineering (Year: 2017).*

* cited by examiner

Primary Examiner — Michael C Zarroli
Assistant Examiner — Ka Chun Leung
(74) Attorney, Agent, or Firm — James M. Kasischke; Michael P. Stanley; Jeffry C. Severson

(57) ABSTRACT

Systems and methods are provided for a wall rolling unmanned aerial vehicle (UAV). A method is provided for rolling the UAV along a path on the surface of the wall. The method includes determining a trajectory for the UAV, determining motor inputs for the UAV, and operating the motors to roll and translate the UAV according to the trajectory along the path. A cage can be provided around the UAV to support contact between the UAV and the wall.

12 Claims, 4 Drawing Sheets

WALL ROLLING UAV WITH RING CAGE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The invention relates to an unmanned aerial vehicle and is directed more particularly to an unmanned aerial vehicle capable of rolling along a wall surface.

(2) Description of the Prior Art

An unmanned aerial vehicle (UAV) is a vehicle capable of airborne movement having no on-board pilot. UAVs may be used for numerous commercial and/or personal applications, including delivery of goods, scientific surveys, aerial photography, agriculture, monitoring of power transmission lines and pipelines, disaster response, military and police operations, ecological monitoring, recreation, and more. Typically, UAVs are controlled remotely by a pilot, by on-board control systems, or some combination thereof. Most UAVs include on-board navigation systems such as inertial navigation systems, such as gyroscopes and/or accelerometers, and/or satellite navigation systems for determining position and orientation and for wayfinding.

Many UAVs include a protective exterior structure, such as a cage, that protects the interior body of the UAV from contact with obstructing objects in an environment in which the UAV is operating, such as humans, animals, and natural and man-made objects. The body comprises a propulsion unit with one or more rotors that allows for movement with multiple degrees of freedom. The internal body includes or is otherwise coupled to support structures not intended to contact an external obstruction. As such, the cage protects such support structures from contacting obstructing objects and reduces interruptions of rotational motion of propellers of the UAV which may disrupt flight and cause degradation to the UAV.

Conventional protective cages are generally capable of protecting the internal frame of the UAV, including rotating propellers included therein, from objects during contact at relatively low energy. Depending on shape of the protective cage, protection is provided from one or more directions. Some cages are substantially spherical protective cages that provide protection from multiple directions but do not allow for the UAV to be positioned against or to move along a vertical surface.

Additionally, while UAVs are configured for free flight movement, some examples also provide systems for positioning and movement against a surface, e.g., a ground surface or a wall. An example of a UAV without a protective cage that is configured for positioning and movement against a vertical wall is described in EP3681799B1. The UAV therein described includes a plurality of legs with wheels that, when the wheels are positioned in direct contact with the vertical wall, enable rolling against the surface in a singular direction.

Some UAVs that include a protective cage are capable of positioning against vertical surfaces, but in these types of UAVs, the cages roll around the UAV, and the UAV moves inside the cage, while the entire cage and UAV assembly cannot roll against the vertical surface.

SUMMARY OF INVENTION

In the present invention, an unmanned aerial vehicle (UAV) is provided that includes a body and a plurality of propellers. The plurality of propellers are configured for moving the UAV with six degrees of freedom. A cage is coupled to and positioned around the body and the propellers. The cage includes a rolling surface that can remain in contact with a substantially vertical surface during a rolling operation.

Static contact during the rolling operation also provides increased stability during movement as more energy is demanded to both roll and move the UAV than just to move it. Static friction at the point of contact also allows better management of wind induced drift. Having a point of contact requires that any linear drift is accompanied by rotational drift which can be more easily measured.

A method for the wall rolling operation of the UAV is also provided. By determining a path for the UAV, motor inputs are determined, and the UAV operates with the determined motor inputs to traverse the path during the wall rolling operation. The rolling operation includes rotation and translation resulting from thrusts and drags from the plurality of propellers while the normal force between the surface and the wall rolling surface of the cage maintains contact between the UAV and the surface. Because the cage is in static contact with the surface during the rolling operation, the UAV's ability to avoid drifting and to resist wind forces is increased. The cage may either transfer wind forces into the surface it is rolling along, or it may act to increase a force of static friction to reduce UAV movement that would result from wind forces. This method makes use of what may be an obstruction during free flight, e.g., a substantially vertical wall, by using it as the surface to roll along.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Features of illustrative embodiments may be understood from the accompanying drawings in conjunction with the description. The elements in the drawings may not be drawn to scale. Some elements and/or dimensions may be enlarged or minimized for the purpose of illustration and understanding of the disclosed embodiments.

DETAILED DESCRIPTION

Figure 1:
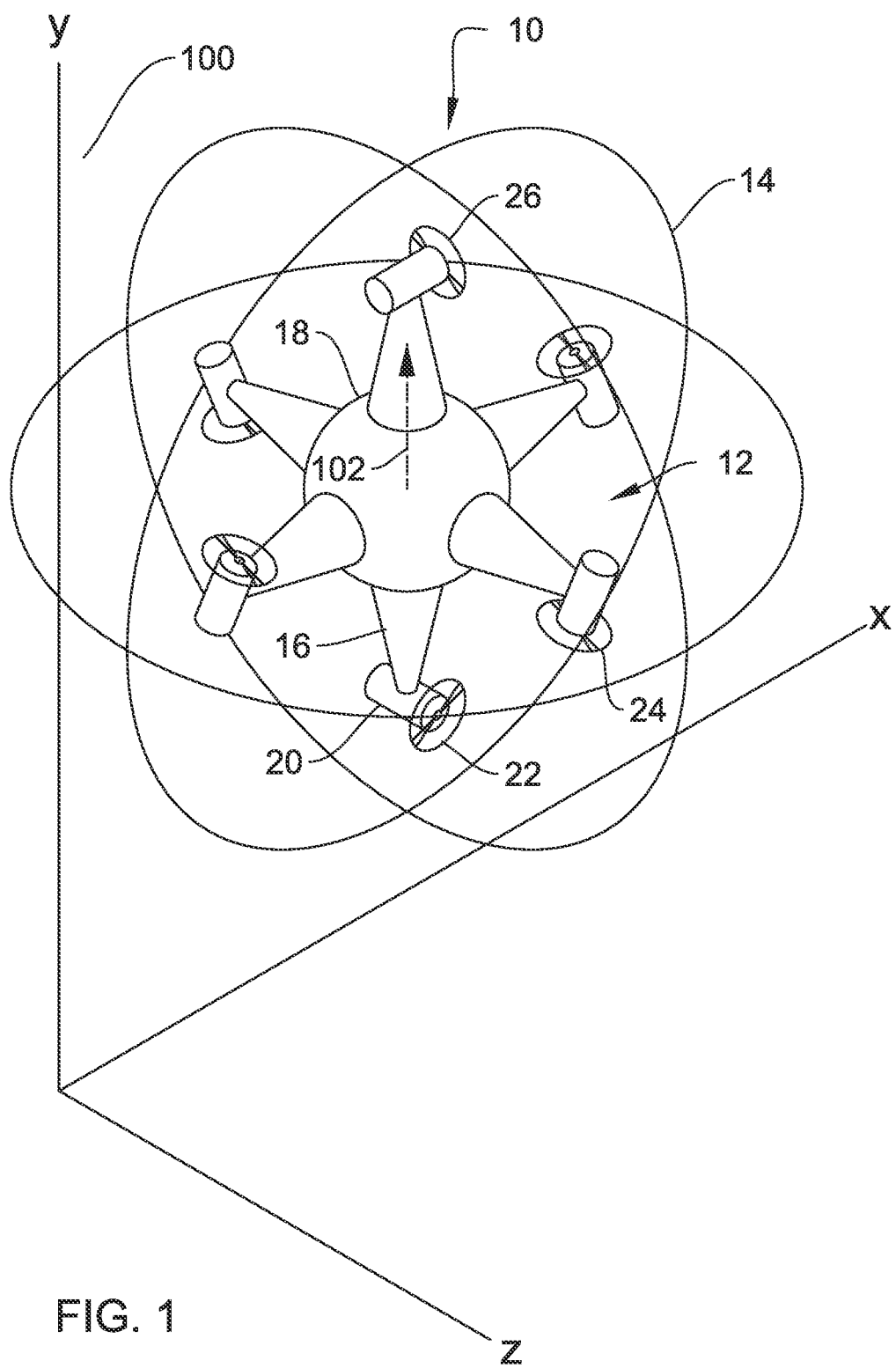
FIG. 1 is a pictorial view of an unmanned aerial vehicle (UAV) in accordance with an embodiment of the present invention.
Figure 2:
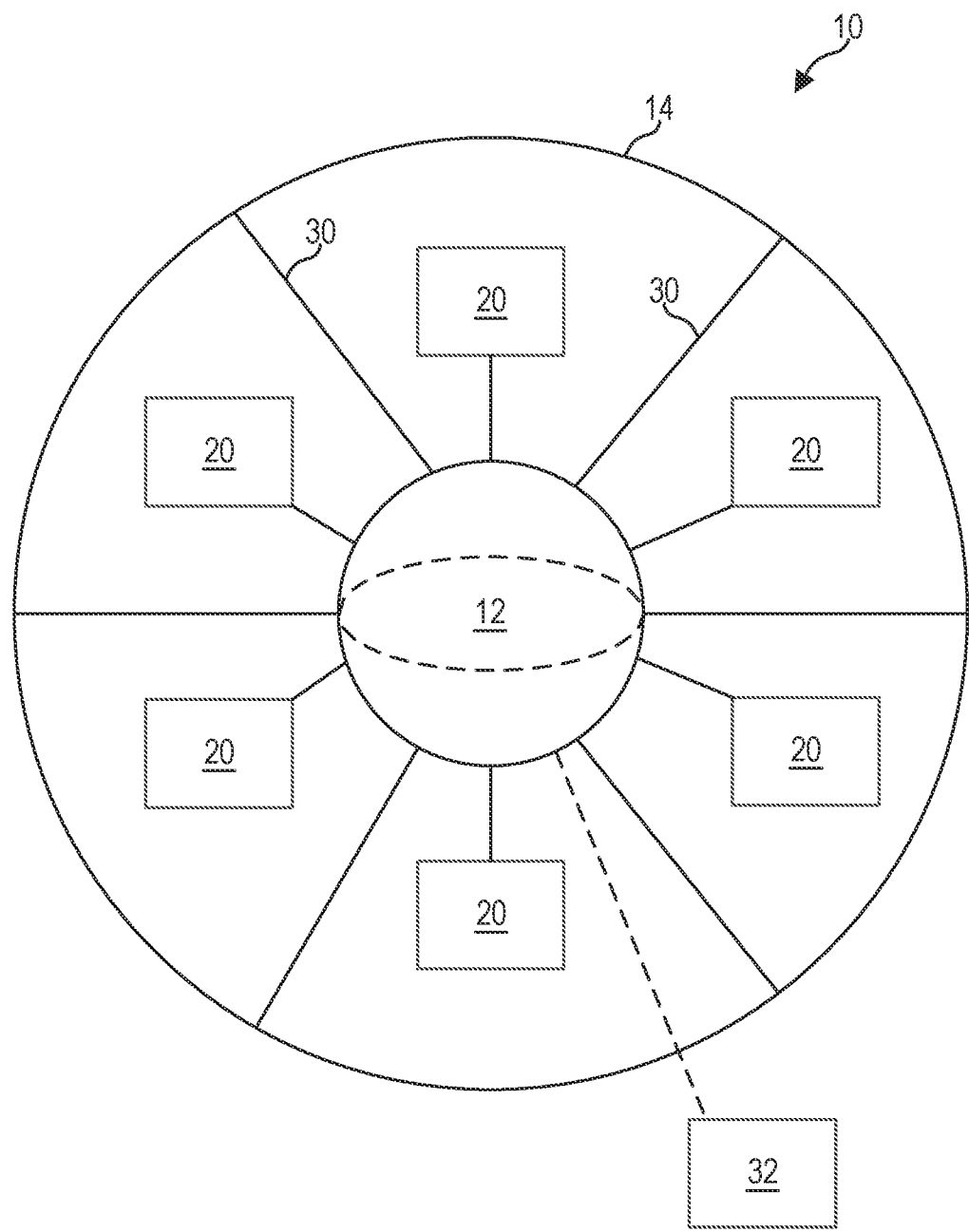
FIG. 2 is a block schematic of the UAV with an embodiment of the present invention.
Figure 3:
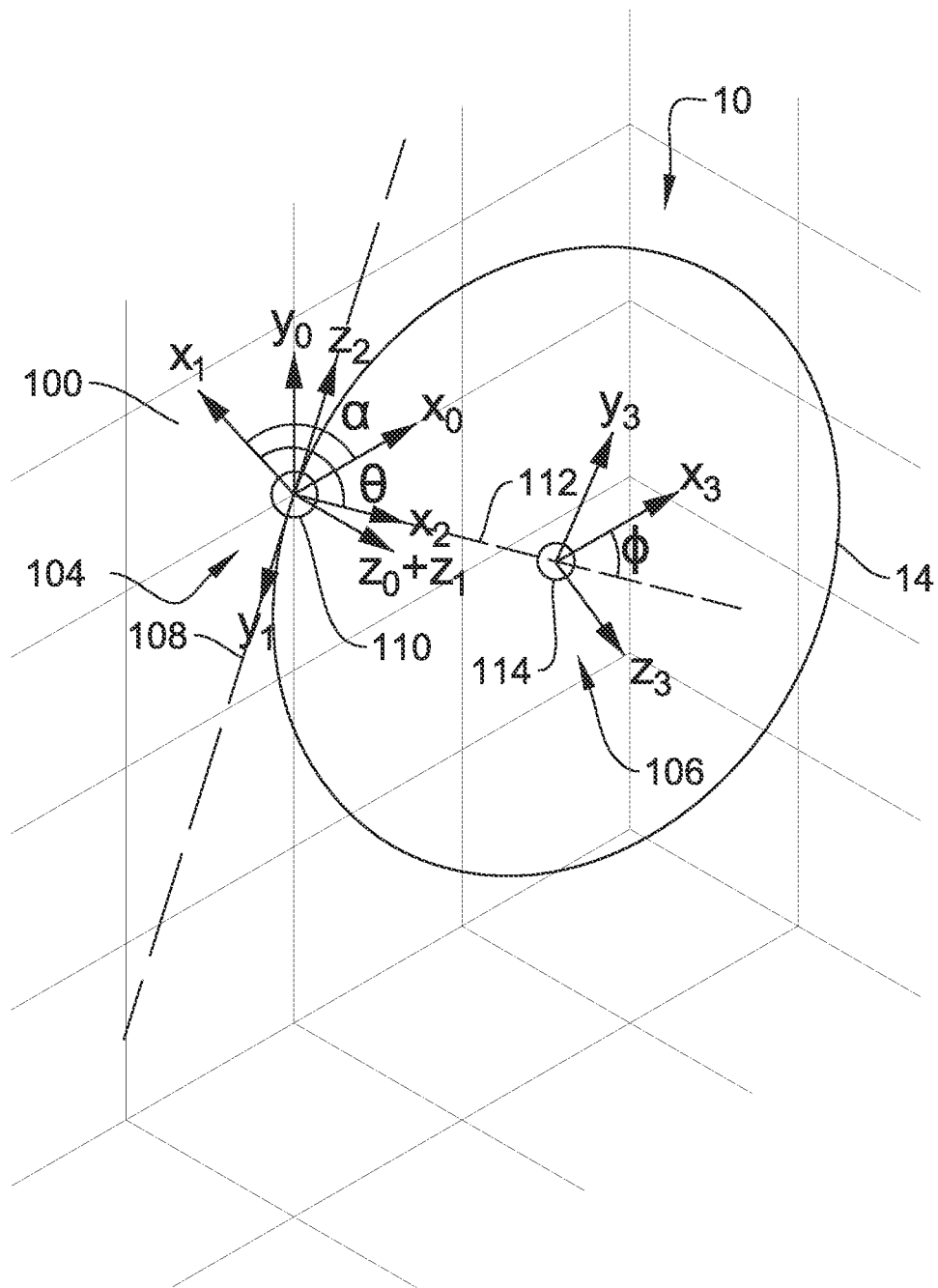
FIG. 3 is a perspective schematic of the UAV of FIG. 1 during a wall rolling operation.

The following description relates to systems and methods for an unmanned aerial vehicle (UAV). The UAV includes a body and, optionally, a ring or a cage. A ring allows the UAV to utilize normal forces for wall rolling stabilization in two dimensions and a cage would provide the same for three dimensions in addition to allowing free flight operation. A pictorial view of an example of the UAV is shown in FIG. 1. A block schematic of the UAV capable of the wall rolling operation is shown in FIG. 2. A schematic perspective view of the UAV of FIG. 1 during the wall rolling operation is shown in FIG. 3. A method of operation for the UAV is provided in FIG. 4.

Referring now to FIG. 1, a perspective view of a UAV system 10 is shown. A coordinate system is provided in FIG. 1 for reference. An x-axis represents a lateral axis, a y-axis represents a vertical axis (e.g., a gravitational axis), and a z-axis represents a longitudinal axis. The coordinate system provided here for reference is relative to a wall 100 against which the UAV system 10 is positioned as depicted in FIG. 1.

UAV system 10 comprises a body 12 and a cage 14. The body 12 comprises a plurality of arms 16 and a central structure 18. The body 12 further includes at least one motor 20. The at least one motor is configured to propel the UAV system 10 via a plurality of propellers 22. In some examples, each of the plurality of propellers 22 is rotated by an individual motor. In other examples, one or more of the plurality of propellers 22 may be rotated by an individual motor. The plurality of arms 16 couple the plurality of propellers 22 and the at least one motor 20 to the central structure 18. In turn, rotation of each of the plurality of propellers 22 translates rotational movement into thrust that propels the UAV system 10.

FIG. 1 depicts six motors, six propellers, and six arms of the UAV system 10, though it should be understood that the depiction shown in FIG. 1 is a non-limiting example and other configurations are possible. Additionally, the body 12 may include additional components not shown in FIG. 1, such as cameras, navigational systems, sensors, and the like.

With the plurality of motors 20 and the plurality of rotating propellers, like propeller 22, the UAV system 10 is capable of movement with six degrees of freedom. This is opposed to other types of UAVs that are capable of movement in less than six degrees of freedom, for example in three or four degrees of freedom. Three of the six degrees of freedom are translational and provide position changes, and the other three of the six degrees of freedom are rotational and provide orientation changes. Translational movements include lateral translation (e.g., left-right), longitudinal translation (e.g., forward-backward), and vertical translation (e.g., up-down). Rotational movements include pitch (e.g., rotation about a lateral axis), roll (e.g., rotation about a longitudinal axis), and yaw (e.g., rotation about a vertical axis). During free flight operation and/or the wall rolling operation, speed of each of the propellers 22 is controlled and adjusted to generate thrust and torque in order to move the UAV system 10 in defined directions and at defined speeds. A fully actuated UAV, such as UAV system 10 in some examples, is capable of rotating (e.g., changing orientation) independent of translating (e.g., hovering in a stable position while changing orientation). Such movement is demanded by the wall rolling operation herein described, which relies on rotating the UAV system 10 without translating the UAV system 10 off the wall 100 against which the UAV system 10 is rolling. Underactuated UAVs, in contrast, are not capable producing such a rolling operation under nonholonomic constraints. As such, the UAV system 10 herein described is a fully actuated system in order to perform the wall rolling operation.

The cage 14 is a rounded cage that includes a wall rolling surface so as to allow and facilitate wall rolling of the UAV system 10, wherein the rounded cage may be a ring, a cylinder, or a sphere. The wall rolling surface is curved as depicted in FIG. 1 and is at least a portion of an exterior surface of the cage 14. The wall rolling surface, in some examples, is the region of the cage 14 that contacts the wall 100 during the wall rolling operation. The wall rolling surface is configured to remain in contact and support contact with the wall 100 via a normal force.

In some examples, the wall 100 may be a perfectly vertical or substantially vertical wall. In other examples, the wall 100 may have other configurations that are not perfectly or substantially vertical. As an example, the wall 100 may be a rounded wall, such as a smoke stack or a wall that is not perfectly vertical.

In the embodiment shown in FIG. 1, the cage 14 of the UAV system 10 is ring shaped. In other embodiments, the cage 14 may be a spherical shape or a cylindrical shape. Examples of a substantially spherical shape include a geodesic sphere or a geometric sphere where geometric shapes, such as triangles or curved lines, are used to create a spherical shape of the cage, maintaining the curved region of the cage 14 as previously described. When the cage 14 is a spherical shape, the body 12 of the UAV system 10 is entirely encompassed within the cage 14. When the cage 14 is a ring shape or a cylindrical shape, at least a portion of the body 12 is encompassed within the cage 14. The ring shape and/or the cylindrical shape may have variable widths and in this way, the cage 14 is positioned around the body 12 of the UAV system 10 to encompass at least a portion of the body 12. Wider widths of, for example, the ring shaped cage provide increased protection to the body 12. Overall, the cage 14 when positioned around the body 12 increases protection provided to the body 12, including protection to the plurality of propellers 22 in the event of contact with an obstruction.

In embodiments in which the cage 14 is a ring shape, as shown in FIG. 1, the cage 14 is positioned around the body 12 of the UAV system 10 such that the cage 14 is parallel with a plane of rotation of the plurality of rotating propellers 22. Alternatively, in embodiments in which the cage 14 is a spherical shape, the cage 14 provides protection to the body 12 in all directions.

In the depiction shown in FIG. 1, the UAV system 10 is positioned against the wall 100. A plane of the wall 100 is a x-y plane such that when the UAV system 10 is positioned in face sharing contact with the wall 100, movement of the UAV system 10 via the rolling operation occurs along the x-y plane. Further, rotation of the UAV system 10 during the rolling operation is about a first z-axis 102 of the body 12 that originates from a central point of the body 12. In some examples, the first z-axis 102 of the body 12 is parallel to the x-y plane of the wall 100, as shown in FIG. 1. In such examples, the body 12 and the cage 14 are said to be 90 degrees rotated compared to the wall 100. A perpendicular alignment such as this increases stability of the UAV system 10 during the rolling operation in which a normal force and, tangentially, static friction, maintain contact between the cage 14 and the wall 100.

When the UAV system 10 is positioned in direct face sharing contact with the wall 100 as shown in FIG. 1, at least one point of the cage 14 is in direct contact with the wall 100. Static friction acts when at least one point of the cage 14 is in contact with the wall 100 and as such, the cage 14 as a rounded cage provides the UAV system 10 with the capability of adhering to and rolling against and/or along the wall 100. During the wall rolling operation, the rolling of the UAV system 10 shifts the one contact point between the cage 14 and the wall 100.

In some examples, the UAV system 10 is an omnicopter that comprises six propellers, like 22, with some of the propellers rotating in alternating directions. For example, a first rotating propeller 22 rotates clockwise and a second rotating propeller 24 that is directly adjacent to the first rotating propeller 22 rotates counterclockwise. A third rotating propeller 26 that is directly adjacent to the second rotating propeller 24 but not directly adjacent to the first rotating propeller 22 (e.g., separated from the first rotating propeller 22 by the second rotating propeller 24) rotates clockwise, opposite the direction of rotation of the second rotating propeller 24 and in the same direction as the first rotating propeller 22. Because of the alternating opposing rotational directions, conservation of angular momentum is achieved when an equal number of opposing rotational directions are applied. Further, the rotating propellers are tilted at predefined angles (e.g., 15 to 30 degrees) in alternating directions (e.g., alternating opposing angles). Thrust and torque generated by the plurality of propellers and motors moves the UAV system 10, including turning and rolling.

During the rolling operation, the UAV system 10 turns, rolls, and/or tilts. Turning comprises changing an orientation of an axis of the UAV system 10, as will be further described with reference to FIG. 3. In this way, an angle of a trajectory of movement for the UAV system 10 compared to the axis system of the wall is changed. Rolling comprises revolving the UAV system 10, including the cage 14 and the body 12, about the first z-axis 102. Tilting comprises altering the angle of first z-axis 102 of the UAV system 10 with respect to the x-y plane of the wall 100. Tilting, in some examples, is used less often than rolling and/or turning, as the UAV system 10 being perpendicular to (e.g., 90 degrees rotated with respect to) the wall 100 provides the most stability for the UAV system 10 during rolling operations.

The wall rolling operation as herein described is possible because the UAV system 10 is a fully actuated UAV and/or capable of movement with six degrees of freedom, including rotations in pitch, roll, and yaw, as described. An underactuated UAV system may not be capable of performing the required turning, rolling, and tilting while also moving at the required translational velocity such as is demanded to perform the wall rolling operation herein described. In this way, the UAV system 10 that includes six degrees of freedom provides for increased mobility both during free flight operation and during rolling operation.

FIG. 2 depicts a schematic illustration of the UAV system 10. In some examples, the cage 14 is coupled to the body 12 via a plurality of attachments 30. The plurality of attachments 30 fix the cage 14 in a specified position around the body 12 such that when the body 12 moves, either during a free flight operation or during a rolling operation, the cage 14 moves in the same manner. It should be understood that while six attachments 30 are depicted in FIG. 2, more or less attachments may be used in some examples. (Attachments 30 are not shown in FIG. 1 in order to avoid obscuring details.) Additionally, in some examples, further attachments not shown may be included to couple components not shown to the body 12, for example a camera may be coupled to the body via an attachment.

The UAV system 10 further comprises a controller 32. In some examples, the controller 32 includes a processor and non-transitory memory in which instructions for executing the wall rolling operation as well as free flight operations is stored. In some examples, the controller 32 is a nonlinear model predictive controller (NMPC) configured with a framework of path generators to generate one or more paths that the UAV system 10 may take to reach a target position and target orientation. The controller 32 is further configured to generate motor inputs for each of the one or more paths. A path can also be specified from an external source such as by a user.

The controller 32, in such examples, further comprises a framework to determine which of the one or more paths is to be taken by the UAV system 10. In some examples, determining which of the one or more paths to take is based on a variety of task needs whereby a path chosen for the UAV to traverse meets the task needs more than other of the one or more paths.

In some examples, the UAV system 10 further includes a navigational system (not shown) and a power source (not shown). The navigational system includes a plurality of sensors, such as gyroscopes and/or accelerometers, which detect position and orientation of the UAV system 10 that may be used by the controller in order to generate the one or more paths and motor inputs for the one or more paths.

FIG. 3 shows the UAV system 10 positioned against the wall 100 during the wall rolling operation. A plurality of frames, e.g., Denavit-Hartenberg (DH) frames, are defined for describing the kinematics of the UAV 10. Using DH frames, a new frame is developed for each joint and link in a system. A base coordinate frame referred to as frame 0 has an origin at point of contact 110 and axes $x_0$, $y_0$, and $z_0$. Frame 1 is developed as a joint at point of contact 110 where the cage 14 makes contact with the wall 100. Frame 1 has axes $x_1$, $y_1$, and $z_1$ and is developed by rotating about axis $z_0$ by angle $\alpha$. Angle $\alpha$ is the angle between $x_0$ and $x_1$. This parameter can be used to control the trajectory 108 of the UAV. Frame 2 is located at the point of contact 110. The z-axis is coincident with the inverse of the y-axis for frame 1. The x-axis is pointing toward the center of the cage/body point 114. The frame 2 y-axis is derived from x and z and is usually not shown. With a spherical cage 14, lines on wall 100 are tangent, and $\theta$ from $x_1$ to $x_2$ is $\pi/2$ or 90°. In the basic application (with a spherical cage 14), $\theta$ is always a right angle, but $\theta$ could be a different angle or variable if the cage is a different shape such as a ring, ellipse, or cardiod. A UAV body frame, frame 3 represents the UAV 10 rolling around an axis $z_3$ perpendicular to the path. Frame 3 has axes $x_3$, $y_3$, and $z_3$ is associated with center point 114. Frame 3 is displaced by $r_{drone}$, the radius of the cage. As long as the cage 14 maintains contact with the wall 100 during the rolling operation, the length of the segment 112 is maintained as equal to the radius of the cage 14. $z_3$ is perpendicular to path 108. $\phi$ represents the rotation of UAV 10, and $\dot{\phi}$ is the angular velocity.

Establishment of these frames allows accounting for orientation and position changes of the body 12 of the UAV system 10 in relation to the frame 0 coordinate system 104. A DH frame table created from these definitions is as follows:

| Frame | Displacement | Rotation about z | Length | Rotation about x |
|---|---|---|---|---|
| 1 | 0 | α | 0 | 0 |
| 2 | 0 | θ | 0 | 90° |
| 3 | 0 | ϕ | $r_{drone}$ | 90° |

The $z_3$ axis of the frame 3 coordinate system 106 is the same as z axis 102 of FIG. 1.

The desired trajectory of UAV 10 along wall 100 is provided by path 108. Angle α is the angle between $x_0$ and $x_1$. The path 108 offset 90° or π/2 radians from this; therefore, α=$x_1$−$x_0$−π/2. For calculation, $x_1$ of frame 1 is set at angle α from axis $x_0$ rotated around $z_0$.

In some examples in which the second angle θ is 90 degrees, the segment 112 is in the same axis as the $z_0$ axis of the frame 0 coordinate system 104 (e.g., a second z-axis). In examples in which the cage 14 is a spherical shape, the second angle θ may be locked perpendicular to the x-y plane of the frame 0 coordinate system 104. In other examples in which the cage 14 is ring shaped, the second angle θ may have variable angles with respect to the x-y plane of the first coordinate system 104.

While frame 1 and frame 2 define orientation (turn and tilt) of the UAV system 10 without a change in position with respect to the base frame, the frame 3 defines a position and orientation of the origin of the frame 3 coordinate system 106 (and consequently the position of the center point 114). The orientation of the frame 3 system 106 is defined by angle Φ. Angle Φ provides angular displacement for rotation of the UAV system 10 during the wall rolling operation.

As noted previously, the wall 100 occupies an x-y plane of the frame 0 coordinate system 104 and the UAV system 10 rolls about the x-y plane of the frame 0 coordinate system 104 during the rolling operation. The position of the point of contact 110 as a point of the exterior wall rolling surface of the cage 14 shifts as the UAV system 10 revolves about the center point 114 during the wall rolling operation. The wall rolling operation is a rolling without slipping operation that includes a combination of translation and rotation where the point of contact 110 is instantaneously at rest. In the case of the wall rolling operation herein described, a normal force between the cage 14 and the wall 100 maintains the contact between the cage 14 and the wall 100 so that the point of contact 110 is instantaneously at rest at any particular moment. Static friction acts to maintain a position of the point of contact 110 at any particular moment by counteracting forces such as wind forces.

Figure 4:
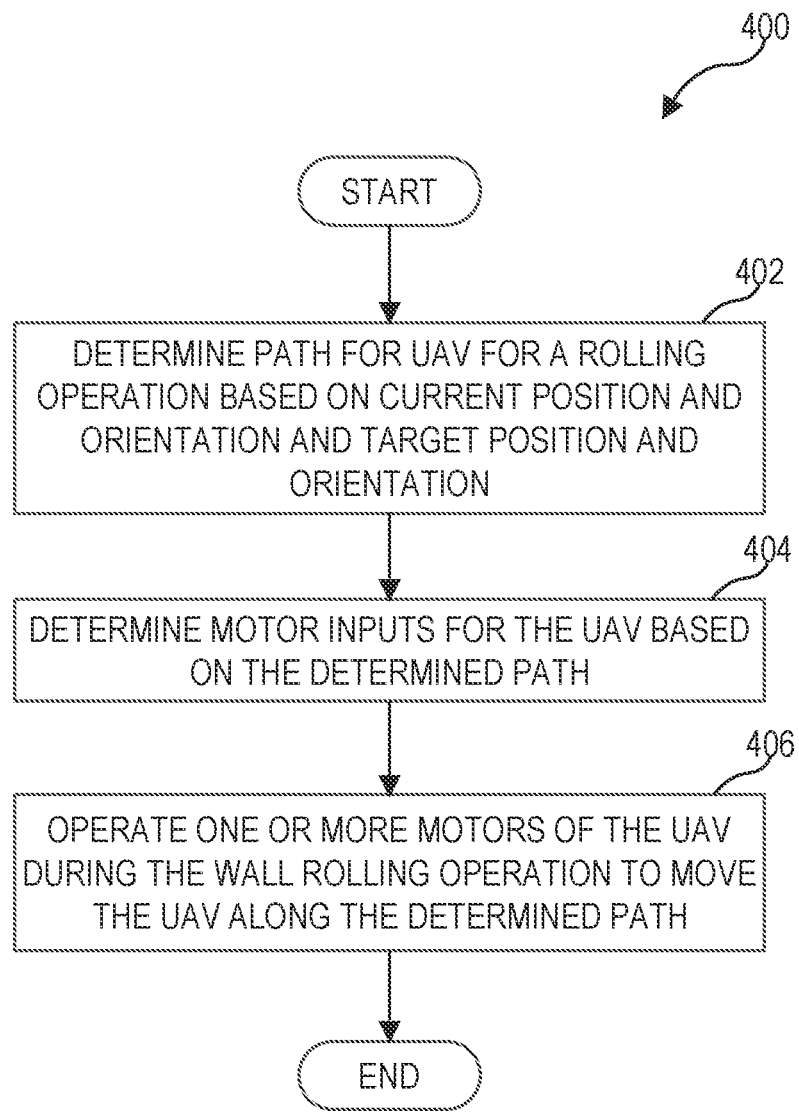
FIG. 4 is a flowchart illustrating a method for the wall rolling operation of the UAV of the present invention.

Referring now to FIG. 4, a flowchart 400 illustrating a UAV system method of operation, such as UAV system 10 that includes the body 12 and the cage 14. The operation described by the method is for a wall rolling operation of the UAV system wherein the cage of the UAV maintains contact with the wall via a normal force. The method will be described in reference to the systems described herein and with regard to FIGS. 1-3, but it should be understood that similar methods may be applied to other systems without departing from the scope of this disclosure. The method is carried out by a controller, and may be stored in non-transitory memory. Instructions for carrying out the method is executed by the controller.

At 402, the method determines a path for the UAV for the rolling operation based on a current position and orientation and a target position and orientation. In order to determine the path for the UAV for the rolling operation, all frames are defined for the system, as described with reference to FIG. 3. Frame 1 includes a first orientation of turn of the UAV system with respect to a base frame (e.g., an axis of the wall). A frame 2 includes a second orientation of tilt of the UAV system with respect to the frame 1. Frame 3 includes a position and third orientation of an axis of the UAV system with respect to the second frame. Each of the frames is defined with respect to the previous frame based on angle changes and position changes. For example, the frame 1 is determined from the base frame (frame 0) based on an angle of turn (e.g., angle α referenced with respect to FIG. 3), frame 2 is determined from frame 1 based on an angle of tilt (e.g., angle θ referenced with respect to FIG. 3), and frame 3 is determined from the frame 2 based on an angle of rotation (e.g., angle Φ referenced with respect to FIG. 3) and a displacement distance (e.g., a radius of the UAV system).

Based on the frames and angle and position changes between each adjacent frame, as described by DH parameters, a kinematic model describes a velocity accompanying the rolling motion. The kinematic model according to the DH frames as described herein is given by equation (1):

$$v_0 = -y_1 * r_{drone} * d(\Phi) \qquad (1)$$

where $v_0$ is linear velocity of the base frame as a vector, $y_1$ is a y unit vector of frame 1, $r_{drone}$ is the radius of the UAV system, and d(Φ) is a derivative of angle Φ, which defines angular velocity. The linear velocity, as described by equation (1) is proportional to the angular velocity. The path determined based on the frames, DH parameters, and equation (1) may include turns as well as rolling motions in order to traverse from a current (e.g., starting) position and orientation to a target position and target orientation. The user specified path includes multiple instantaneous trajectories for maneuvering the UAV. Multiple trajectories are defined by the path determined because of turns needed to reach the target position and target orientation.

At 404, the method includes determining motor inputs for the UAV based on the determined path. The determined motor inputs may be such that the UAV when operating the motor inputs as determined at 404, traverses along the path determined at 402. A modified dynamic model that describes angular velocity and acceleration of the system accounts for a normal force between the cage and the wall. Angular acceleration and linear acceleration are initially defined based on equation (1), whereby the linear velocity and the angular velocity are derived to respectively provide linear acceleration and angular acceleration. The position rotation and all derivatives are calculated utilizing the DH frame system. The modified dynamic model as herein described includes three equations. Linear acceleration is given by equation (2):

$$\ddot{p} = -g + \frac{1}{m} R_B^W F u + \frac{1}{m} R_0^W \begin{bmatrix} 0 \\ 0 \\ N \end{bmatrix} \qquad (2)$$

where $\ddot{p}$ is linear acceleration (p being a position of the UAV), g is acceleration from gravity, m is a mass of the UAV system, $R_B^W$ is a rotation matrix from a body frame (e.g., the frame 3) in a world frame, wherein the world frame is an arbitrarily defined frame used to define relative positions and orientations of other frames, F is a thrust coefficient matrix, u is a motor input vector, $R_0^W$ is a rotation matrix from a zero frame (e.g., the base frame) to the world frame, and N is a magnitude of the normal force. Equation (2) describes a first relationship between the linear acceleration and the thrust motor input. Having known the linear acceleration value based on the kinematic model (e.g., equation (1)), the thrust motor input can be solved for based on equation (2), provided the UAV system includes six independent rotors.

Angular acceleration is given by equation (3):

$$\dot{\omega}_B = -I_B^{-1}(\omega_B \times I_B \omega_B) + I_B^{-1} Hu + I_B^{-1}\left(P_A^3 \times R_0^3 \begin{bmatrix} 0 \\ 0 \\ N \end{bmatrix}\right) \quad (3)$$

where $\dot{\omega}_B$ is instantaneous angular acceleration (wherein $\omega_B$ is angular velocity), $I_B$ is inertia of the body of the UAV system, H is a drag coefficient matrix, u is the motor input vector, a second product Hu providing a drag motor input, $P_A^3$ is a position from the body of the UAV to a point of contact between the UAV system and the wall (e.g., point of contact 110), $R_0^3$ is a rotation matrix from the base frame to the third frame, and N is again the magnitude of the normal force that the UAV System produces as a result of static friction expressed as part of a matrix. Equation (3) describes a second relationship between the angular acceleration and the drag motor input. Having known the angular acceleration based on the kinematic model, the drag motor input can be solved for based on equation (3), provided the UAV system includes six independent rotors.

An angular velocity vector is given by equation (4):

$$\dot{R}_B^W = R_B^W [\omega_B]_\wedge \quad (4)$$

where $R_B^W$ is a rotation matrix from a body of the UAV system in the world frame, the derivative of which provides the angular velocity vector, $\omega_B$ is average angular velocity, and $\wedge$ is a hat function (e.g., a triangle function).

With equations (2), (3), and (4), motor inputs can be solved for, including drag and thrust motor inputs. These motor inputs are provided to the UAV system in order for the UAV system to traverse along the determined path.

At 406, the method includes operating one or more motors of the UAV system during the wall rolling operation to move the UAV along the determined path. The motor inputs, as determined based on equations (2), (3), and (4) at 404, are applied to the one or more motors in order to rotate rotors and rotating propellers to move the UAV system. Movement of the UAV system for the determined path includes orientation and translation changes, including turning (e.g., a yaw rotation), tilting (e.g., a pitch rotation), and rolling (e.g., a roll rotation combined with translation to produce rolling motion as previously described). In some examples where there are sufficient normal forces, motor input for rolling may include rotation but not translation inputs, as translation is provided from shifting of the point of contact that results from revolution about the $y_3$-axis of the UAV system and normal force between the wall and a cage of the UAV system.

Further, static friction acts tangentially to maintain a position of the UAV against a wall. Potential static friction, which is proportional to the normal force, may maintain a position of a point of contact between the UAV and the wall at any particular moment by counteracting forces such as wind forces that would alter the position of the point of contact.

A technical effect of the method herein provided is that a fully actuated UAV system that includes a body and a substantially rounded cage is capable of rolling against a fixed surface due to a normal force between the wall and the UAV during a wall rolling operation. Further, static friction and the normal force may maintain position of the UAV against the wall. A rolling motion that includes rotation about a central axis and translation along an x-y plane of the wall is provided by a method wherein a path is determined and motor inputs for the UAV to traverse the path via the rolling motion are determined. Rolling against the wall, which for a free flight operation may be an obstacle, provides increased stability, decreased drift away from a path due to wind forces, and increased certainty of trajectory due to decreased drift and increased stability. Increased stability is provided as more energy is demanded to both roll and move the UAV than just to move it. Static contact during the rolling operation further reduces momentum gained during movement, therefore further decreasing drift from the path.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for a wall rolling operation of an unmanned aerial vehicle (UAV) having at least one motor along a predetermined path comprising:
    determining a trajectory for the UAV for the wall rolling operation based on a current position and a current orientation of the UAV and a target position and a target orientation of the UAV and the predetermined path;
    developing kinematic parameters relating the determined trajectory to UAV movement;
    determining motor inputs for the at least one motor of the UAV specific to the developed kinematic parameters, the motor inputs including a thrust motor input and a drag motor input wherein the motor inputs provide for six degree of freedom movement of the UAV; and
    operating the UAV based on the determined motor inputs to move the UAV along the determined trajectory during the wall rolling operation along the predetermined path.

2. The method in accordance with claim 1 further comprising operating the UAV in free flight when not in wall rolling operation.

3. A method for a wall rolling operation of an unmanned aerial vehicle (UAV) having at least one motor along a predetermined path comprising:
    determining a trajectory for the UAV for the wall rolling operation based on a current position and a current orientation of the UAV and a target position and a target orientation of the UAV and the predetermined path;

developing kinematic parameters relating the determined trajectory to UAV movement;

determining motor inputs for the at least one motor of the UAV specific to the developed kinematic parameters, the motor inputs including a thrust motor input and a drag motor input; and operating the UAV based on the determined motor inputs to move the UAV along the determined trajectory during the wall rolling operation along the predetermined path;

wherein developing kinematic parameters includes defining a plurality of frames that includes a base coordinate frame and a UAV body frame, the base coordinate frame having an origin at a point of contact between a cage surrounding the UAV and the wall wherein one axis of the base coordinate frame is perpendicular to the wall, and the UAV body frame having an origin of the UAV body frame and defining position and orientation of the UAV with respect to the base coordinate frame.

4. The method in accordance with claim 3, wherein the predetermined path is positioned along an x-y plane of a wall and the x-y plane of the wall is vertical.

5. The method in accordance with claim 3, wherein defining the plurality of frames includes defining a plurality of angles including a first angle of the determined trajectory with respect to the base coordinate frame, a second angle between origin of the base coordinate frame and the origin of the UAV body frame, and a third angle of angular displacement with respect to a z axis of the UAV body frame parallel to a perpendicular to the determined trajectory.

6. The method in accordance with claim 5 wherein the UAV has a spherical cage having a center at the origin of the UAV body frame.

7. The method in accordance with claim 6, wherein a time derivative of the third angle provides an angular velocity for the UAV that is proportional to a linear velocity of the point of contact as the UAV traverses the determined trajectory.

8. The method in accordance with claim 7, wherein determining motor inputs includes determining an angular acceleration for the UAV and a linear acceleration for the UAV traveling on the determined trajectory.

9. The method in accordance with claim 8 wherein operating the UAV results in the UAV revolving about the z axis of the UAV body frame, shifting the point of contact between the UAV and the wall, and translating the UAV with a linear velocity along the determined trajectory.

10. An unmanned aerial vehicle (UAV) for maneuvering along a wall comprising:

a body including a plurality of motors joined to propellers;

a rounded cage positioned around said body and configured to support contact between said rounded cage and the wall when said rounded cage exerts a normal force on the wall; and a controller operatively joined said body and the plurality of motors configured to produce motor inputs for a wall rolling operation along an externally specified path along the wall and to provide motor inputs to the motors to maneuver the UAV along the externally specified path;

wherein:

the externally specified path is based on a current position and a current orientation of the UAV and a target position and a target orientation of the UAV;

said controller develops kinematic parameters relating the externally specified path to UAV movement;

said controller determines motor inputs specific to the developed kinematic parameters, the motor inputs including a thrust motor input and a drag motor input; and said controller is capable of operating the UAV based on the determined motor inputs to move the UAV along the path during a wall rolling operation.

11. The UAV in accordance with claim 10, wherein said controller develops kinematic parameters by defining a plurality of frames that includes a base coordinate frame and a UAV body frame, the base coordinate frame having an origin at a point of contact between said rounded cage and the wall wherein one axis of the base coordinate frame is perpendicular to the wall, and the UAV body frame has an origin and defines position and orientation of said body with respect to the base coordinate frame.

12. The UAV in accordance with claim 11, wherein said controller determines the plurality of frames by defining a plurality of angles including a first angle of the externally specified path with respect to the base coordinate frame, a second angle between the origin of the base coordinate frame and the origin of the UAV body frame, and a third angle of angular displacement with respect to a z axis of the UAV body frame parallel to a perpendicular to the externally specified path.

* * * * *